(12) United States Patent
Klappholz

(10) Patent No.: US 6,820,263 B1
(45) Date of Patent: Nov. 16, 2004

(54) METHODS AND SYSTEM FOR TIME MANAGEMENT IN A SHARED MEMORY PARALLEL PROCESSOR COMPUTING ENVIRONMENT

(75) Inventor: Nicole Klappholz, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 524 days.

(21) Appl. No.: 09/750,217

(22) Filed: Dec. 29, 2000

(51) Int. Cl.$^7$ ................................................ G06F 9/46
(52) U.S. Cl. .................... 718/108; 718/102; 718/103; 718/107
(58) Field of Search ................................ 709/100–108

(56) References Cited

U.S. PATENT DOCUMENTS 4,625,081 A * 11/1986 Lotito et al. ............. 379/88.26
5,465,335 A * 11/1995 Anderson ................... 718/107
5,768,572 A *  6/1998 George et al. ............. 713/502
5,790,851 A *  8/1998 Frank et al. ............... 718/104
5,835,762 A * 11/1998 Gans et al. ................ 718/100
6,421,701 B1 *  7/2002 Elnozahy ................... 718/100

* cited by examiner

Primary Examiner—John Follansbee
Assistant Examiner—Ashok B. Patel
(74) Attorney, Agent, or Firm—Max R. Wood; Ogilvy Renault

(57) ABSTRACT

A multiprocessor computing machine is adapted to execute processes concurrently without interrupt to improve system throughput. The respective processors maintain local clocks initialized by a scheduler program to determine how long each process can execute without interrupt. Expiry of the local clock generates a hardware interrupt that switches out the process unless lock has been declared by the process. A process that is enabled to declare lock may continue to process for a predetermined period of time. A timer queue is also managed without interrupt. System resources are thereby conserved and throughput is improved.

36 Claims, 6 Drawing Sheets

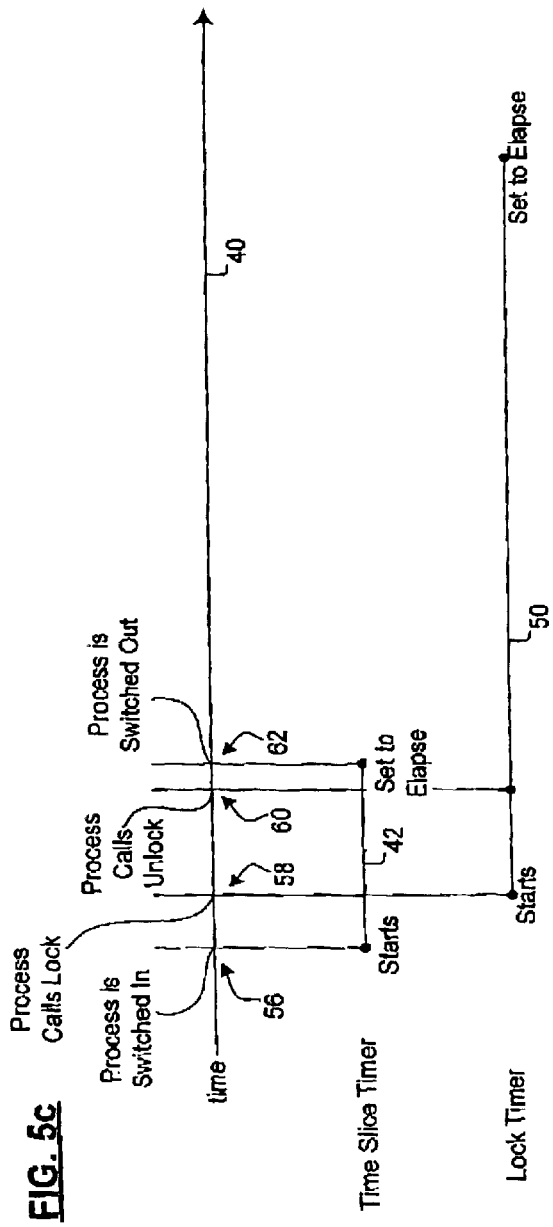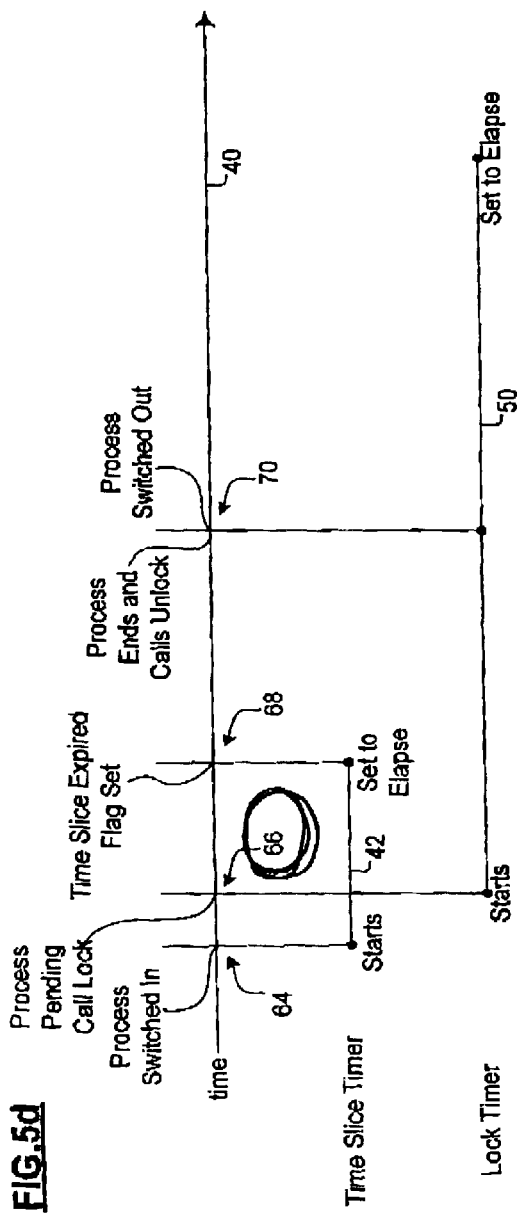

METHODS AND SYSTEM FOR TIME MANAGEMENT IN A SHARED MEMORY PARALLEL PROCESSOR COMPUTING ENVIRONMENT

CROSS-REFERENCE TO RELATED APPLICATIONS

This is the first application filed for the present invention.

MICROFICHE APPENDIX

Not applicable.

TECHNICAL FIELD

This invention relates, in general, to shared memory systems for use in parallel processing environments and, in particular, to methods and systems for time management in a shared memory parallel processor environment.

BACKGROUND OF THE INVENTION

The rapid growth of the Public Switched Telephone Network (PSTN), especially the rapid expansion of service features has strained the processing capacity of incumbent switching equipment. This is particularly the case in wireless telephony environments where messaging loads between mobile switching centers are great. As is well known, most incumbent switching equipment in the PSTN have processing architectures that are based on a single central control component that is responsible for all top level processing in the system. Such single-central-control-component-architectures provide the advantage to application programmers of some simplification with respect to resource control, flow control and inter-process communication. However, single-central-control-component-architectures are subject to serious bottlenecks, due principally to the fact that each process is dependent on the capacity of the single core processor. There has therefore been an acute interest in developing parallel processor control for incumbent switching systems in order to improve performance and permit the addition of new processor-intensive service features.

Parallel processor architectures are well known. However, the software written for parallel processor architectures is specifically designed to avoid processor conflicts while accessing shared resources, such as shared memory. This is accomplished by providing exclusive access to the shared memories using software semaphores or methods for locking memory access buses, and the like. However, incumbent switching systems in the PSTN were typically written for a central control component, and, in many cases, it is not economically feasible to rewrite the application code for a parallel processor architecture. Aside from the complexity of such a rewrite, the time and cost incurred to complete such a task is generally considered to be prohibitive.

It is known in the art that a shared memory parallel processor computing environment requires time management in order to ensure that any given process or class of processes is not permitted to monopolize processor time to the exclusion of other processes. It is also known that the time management must ensure that adequate processing time is allocated to system-critical processes, such as payload processes. Time management is therefore a critical aspect of the control of a shared memory parallel processor computing environment.

A time management algorithm for a shared memory parallel processor computing environment designed and implemented by the Assignee operated on the basis of timed hardware interrupts. At each interrupt, a timer queue was shuffled and process execution on each of the parallel processors was controlled. This is a common model of time management implemented in many prior art computing machines. One problem with time management based on-timed interrupts is that each interrupt consumes a certain proportion of system resources. If the interrupts are executed on a timed schedule, then at least some of the interrupts are invariably executed unnecessarily. Thus, system resources are wasted. Furthermore, in order to manage computing resources using timed interrupts, unnecessary operations are performed at each interrupt in order to ensure that processes do not monopolize resources. For example, each time an interrupt occurs, a status of a process being executed by each processor must be verified to ensure that the process has not used more than its share of computing resources. This occurs even if the process has just been started.

While the timed interrupt represents a viable approach to time management in a shared memory parallel processor computing environment, it is not an optimal one because it fails to utilize system resources in a most efficient way.

It is therefore highly desirable to provide a method and system for time management processes in a shared memory, parallel processor computing environment that enhances performance by ensuring that access to computing resources is optimized.

SUMMARY OF THE INVENTION

It is therefore an object of the invention to provide methods for time management in a shared memory parallel processing computing environment.

It is a further object of the invention to provide a shared memory parallel processor computing machine with improved time management for process execution and timer queue management.

The invention therefore provides a method of managing execution time in a shared memory parallel processor computing environment in which a plurality of independent processors execute processes simultaneously. The method comprises steps of: defining a plurality of process classes and assigning each process to be executed to a one of the process classes; defining an execution time slice for each of the process classes; and permitting a process to be executed by a one of the processors without interruption until the execution time slice associated with the process class has expired.

The method further comprises a step of enabling processes of at least one of the process classes to call a lock procedure during execution, which permits the process to continue to be executed without interrupt for a predefined period of time after the time slice associated with the process class has expired. The at least one process is also enabled to call an unlock procedure to permit execution of the process to be terminated before the predefined period of time has expired. The predefined lock period may be an integer multiple of the time slice associated with the process class. Preferably, the lock procedure may be called repeatedly by the same process in order to simplify programming and accounting.

The invention further provides a method of managing a timer queue in a shared memory parallel processor computing environment in which a plurality of independent processors execute processes simultaneously, the timer queue being used to queue processes in a wait state until a predetermined process removal time has expired, the method comprising steps of: defining a variable for storing a time at which a next process is to be removed from the timer queue; periodically examining the variable without generating a system interrupt to determine whether the time stored in the variable is less than or equal to an instant system time; removing each process from the timer queue which has an associated removal time that is less than or equal to the instant system time; and re-computing a time at which a next process is to be removed from the timer queue, and storing the re-computed time in the variable. Adding new processes to the timer queue further comprises steps of: computing a delay time specified by the process to be added to the queue; comparing the computed delay time with the time stored in the variable; if the computed delay time is less than the delay time stored in the variable, replacing the delay time stored in the variable; and adding the process to the timer queue.

The invention further provides a shared memory parallel processor computing machine in which a plurality of independent processors simultaneously execute processes, comprising: means for associating each process to be executed with a process class that defines rights and priorities associated with the process; means for associating an execution time slice with each of the process classes; and means for monitoring a process during execution to permit the process to be executed by a one of the processors without interruption until the execution time slice associated with the process class has expired. The means for permitting a process to be executed without interruption preferably comprises a time slice counter that is initialized to count representative of the predetermined execution time slice when the process is scheduled to be run, and is decremented at predetermined time intervals while the process is being executed.

The computing machine further comprises a timer queue for queuing processes to be executed for a predetermined period of time, the timer queue being managed without interrupt until a process in the timer queue is ready to be transferred to a ready queue for execution by a one of the processors. A timer queue variable stores a time at which a next process is to be removed from the timer queue and placed in the ready queue. A scheduler periodically compares the timer queue variable with a current system time to determine when a next process is to be removed from the timer queue and placed in the ready queue. The scheduler program is further adapted to compute a time that a process is to be removed from the timer queue when the process is to be added to the timer queue, and the scheduler is further adapted to update the timer queue variable if the timer queue variable is greater than the time computed by the scheduler program.

BRIEF DESCRIPTION OF THE DRAWINGS

Further features and advantages of the present invention will become apparent from the following detailed description, taken in combination with the appended drawings, in which:

FIGS. 5a–5d are time line diagrams illustrating a time management process in accordance with the invention by which processes are enabled to be executed by a parallel processor without interruption for a predetermined, engineered period of time;

It will be noted that throughout the appended drawings, like features are identified by like reference numerals.

DETAILED DESCRIPTION OF THE PREFERRED EMBODIMENT

This invention provides methods and systems for time management in a shared memory parallel processor computing environment. In accordance with the invention, a plurality of process classes are respectively allocated an execution time slice. Each process is associated with one of the classes so that each process inherits the execution time slice from the class of which the process is a member. The execution time slice determines how long a process may be executed by any one of the processors without interrupt. Certain of the classes are also enabled to extend the length of the execution time by calling a lock procedure that permits the process to continue processing without interrupt. The lock procedure sets a lock flag and initializes a lock clock that determines a length of time that the process may continue to be executed without interrupt after the initial time slice has expired.

The invention also provides a system and method for managing a timer queue. The timer queue is used to queue processes that request a predetermined time-out period prior to being placed in a ready queue for execution by one of the processors. In accordance with the method, the timer queue is managed without interrupt by maintaining a timer queue time variable that indicates a time when a next process is to be removed from the timer queue and placed in the ready queue. A scheduler program periodically monitors the time variable and removes process(es) when the variable is less than or equal to a system time. When a new process is added to the timer queue, a removal time for the process is computed and the timer queue time variable is replaced with the removal time if the removal time, is less than the time variable.

Figure 1:
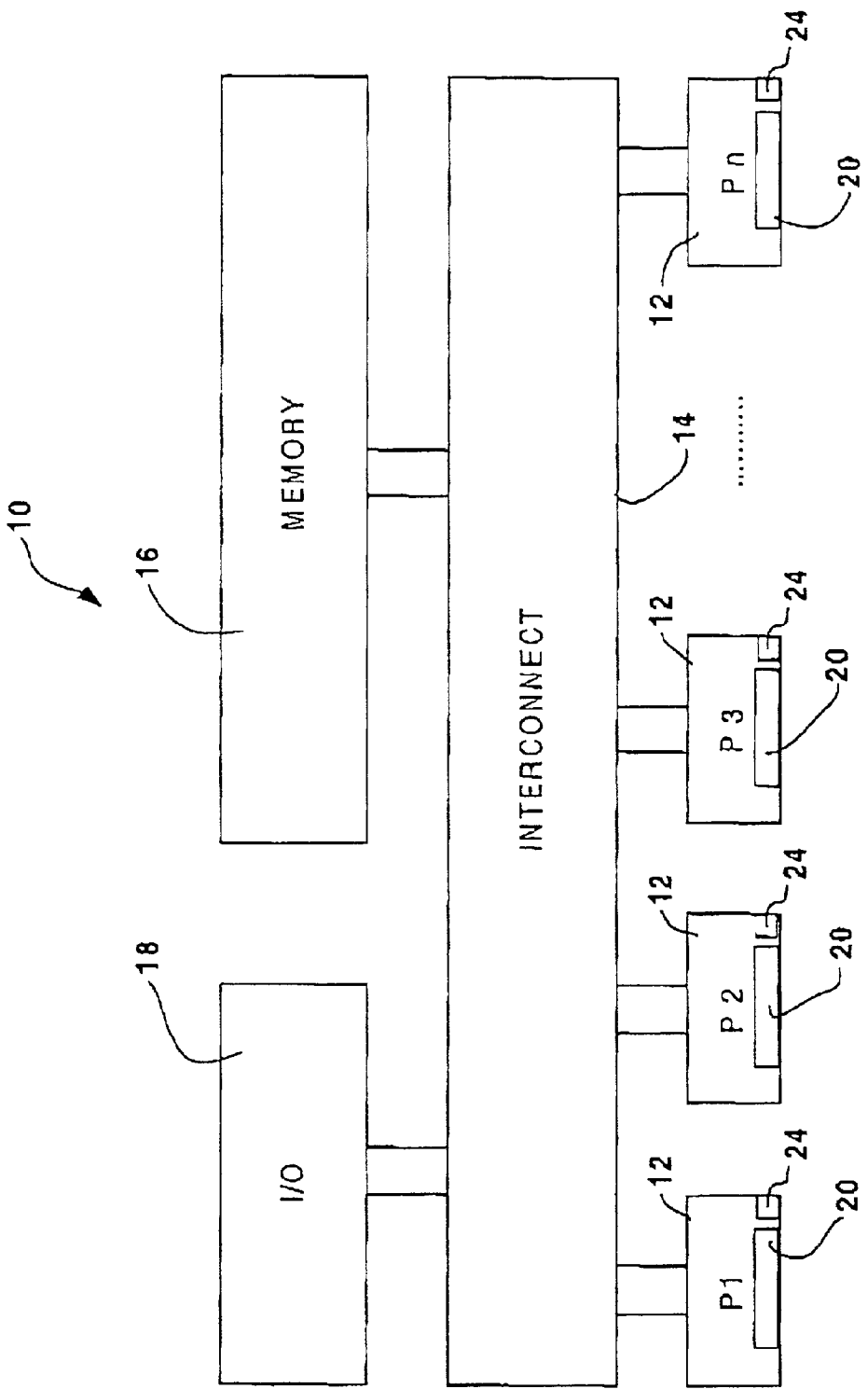
FIG. 1 is a schematic diagram of a shared memory parallel processor computing environment that is known in the art.

FIG. 1 is a schematic diagram of a parallel processor shared memory system 10, which is well known in the prior art. The system 10 includes a plurality of processors 12 (only four of which are shown) connected through an interconnect 14 to a main shared memory 16 made up of one or more memory modules (only one module is shown), in a manner well known in the art. One or more IO devices 16 are also connected to the interconnect 14. Such systems 10 are commonly equipped with redundant hardware components to increase fault tolerance, but redundancy is not essential to the invention and the redundant elements are not illustrated. Each processor 12 has a respective cache memory 20, that is also well known in the art. Each memory module 16 includes a data memory and memory ownership control functionality, commonly implemented in firmware.

Figure 2:
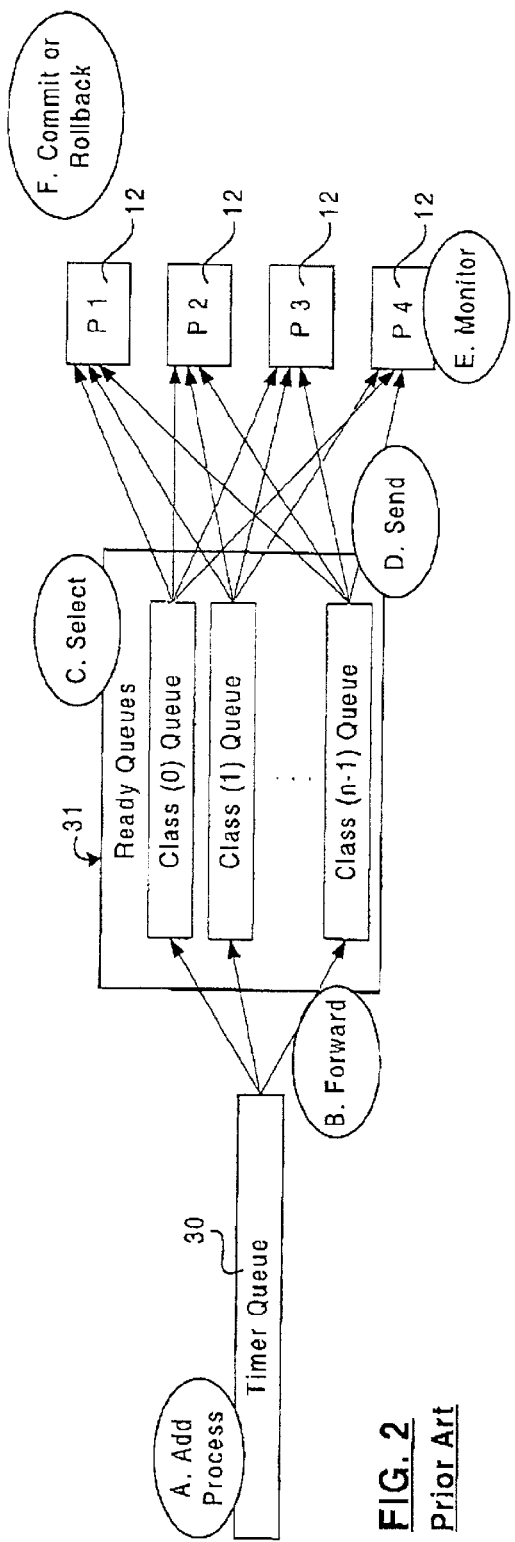
FIG. 2 is a schematic diagram illustrating a prior art process performed by a scheduler program while moving a process to be executed from a timer queue to one of a plurality of parallel processors in a shared memory parallel processor computing environment.

FIG. 2 is a schematic diagram illustrating a prior art process performed in the shared memory parallel processor computing environment shown in FIG. 1 in which processes are moved from a timer queue 30 to ready queues 31. The timer queue 30 is used to queue processes that request a specified time delay before being placed in one of the ready queues 31 prior to execution by a respective processor 12. When the specified time requested by a process placed in timer queue 30 has expired, a scheduler program (not shown) moves the process from the timer queue 30 to a one of the ready queues 31. The ready queues 31 are arranged by class, in a manner well known in the art. Each process is associated with a specific class and each class has associated rights and priorities which are peculiar to the class and determined by system engineers. The respective ready queues 31 are first-in first-out (FIFO) queues. Processes are added to a rear of the ready queue 30 and are moved to the processor 12 when they have advanced to a front of the ready queue 31. As is well known in the art, processes may be added to the ready queue 31 without first entering the timer queue 30. For the purposes of describing a first aspect of the invention, however, the movement of a process from the timer queue to execution by processor 12 is described.

The scheduler adds a process to the timer queue 31 (step A) on request by the process. The process specifies a specific duration of time for which it is to be timed-out in the timer queue 30. The specific duration of time is specified, for example, by integer number of time units. The duration of each time unit is engineered in accordance with system requirements. When the scheduler adds a process to the timer queue 30, the scheduler multiplies the number of time units requested by the engineered duration of each time unit to derive the requested duration of time. The duration is expressed in a time unit (milliseconds, for example) The scheduler then adds the time duration to a current time indicated by a system clock, for example, to derive a removal time for the process. The removal time indicates a time at which the process is to be removed from the timer queue 30 and moved to a one of the ready queues 31. When the time duration for a process in timer queue 30 has expired, the scheduler moves the process (step B) to a one of the ready queues dictated by a class with which the process is associated. As explained above, the process is moved to a tail of the ready queue 31 and, as soon as the process is shifted to a front of the ready queue 31, the process is selected (step C) and sent (step D) to an available one of the processors 12. The scheduler then monitors each process (step E) to determine when the process has completed processing, or has exceeded an allotted processing time. When a process is "switched out" of a processor 12, the process is either committed or rolled back (step F), in a manner well known in the art of shared memory parallel processing. The entire process shown in FIG. 2 is generally managed using timed hardware interrupts, which trigger the scheduler program to perform the respective steps A–F in a cyclical series of steps that is repeated at each timed interrupt. As is well understood, this tends to be wasteful of system resources.

Figure 3:
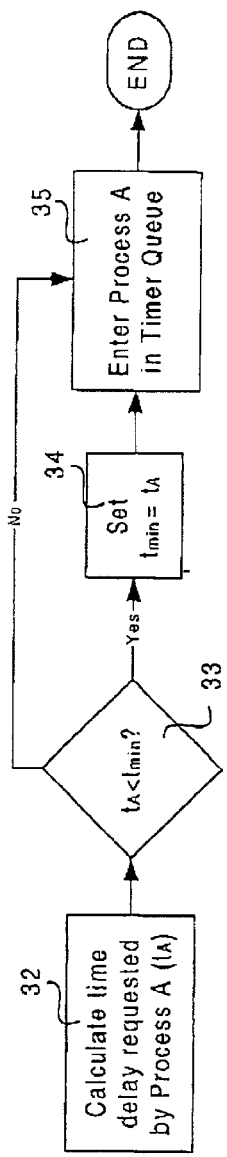
FIG. 3 is a first process in accordance with the invention for managing a timer queue without timed interrupts.
Figure 4:
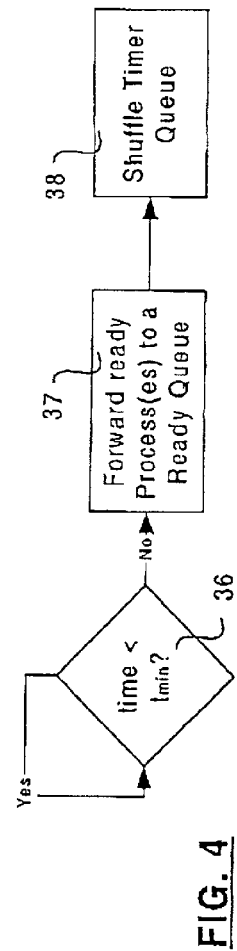
FIG. 4 is a flow diagram illustrating a second process in accordance with the invention for managing the timer queue without timed interrupts.

FIGS. 3 and 4 illustrate a method in accordance with the invention for managing the timer queue 30 without dependence on timed interrupts. In accordance with the invention, the scheduler calculates a time delay requested by a process, process A, for example, (step 32). The calculated time delay ($t_A$) is compared with a global variable ($t_{min}$) to determine whether $t_A$ is less than ton (step 33). If the calculated time delay is determined in step 33 to be-greater than the global variable, the process is entered in the timer queue 30 (step 35) and the scheduler terminates the process. If, however, the scheduler determines in step 33 that the calculated time delay is less than the time indicated in the global variable ($t_{min}$), the global variable is set to the calculated time delay (step 34), before the process is entered in the timer queue 30 (step 35). The global variable (ten) is monitored once during each scheduler cycle, as shown at step 36 of FIG. 4. The scheduler program monitors the global variable by comparing a current system time with the global variable ($t_{min}$), as shown at step 36. If the system time is not greater or equal to the global variable, the scheduler program moves on to perform other tasks required during its scheduled cycle. If, however, the scheduler program determines in step 36 that the system time is greater than or equal to the global variable ($t_{min}$), the scheduler program forwards to ready queue 31 (FIG. 2) any process(es) waiting in the timer queue having an associated time delay that is less than or equal to the current system time (step 37). After the process(es) have been moved from the timer queue 30 to the ready queues 31, the scheduler rearranges the timer queue (step 38), in a manner well known in the art. The timer queue 30 is therefore managed without timed interrupts, and system resources are thereby conserved.

FIGS. 5a–5d are time line diagrams illustrating the time management of process execution in accordance with the invention. In accordance with the invention, each class of processes is allocated an engineered process execution time slice. The time slice has a predetermined duration during which the process is permitted to be executed by a one of the processors 12 without interruption. Every process is entitled to execute without interruption during the predetermined time slice allocated to its respective class. As is well understood in the art, certain processes executed by the processors 12 are system or function critical processes which must be permitted to execute to completion. At the same time, all processes must be policed to ensure that a rogue process does not consume unwarranted amounts of processor time. The methods in accordance with the invention ensure that processes are permitted to continue execution uninterrupted until a process has completed or a maximum engineered interval has been exceeded.

Figure 5A:
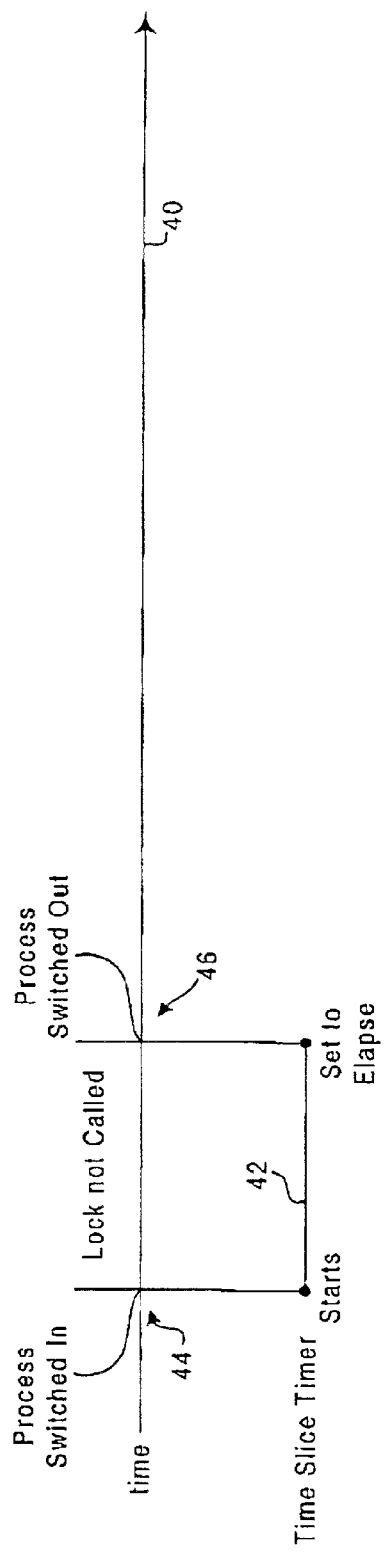

FIG. 5a shows a time line 40 which schematically illustrates the execution of a process by one of the processors 12 in which processing terminates normally within a time slice 42 allocated to the process class. As shown in FIG. 5a, the process is "switched in" by the scheduler, as shown at 44, and the processor 12 (FIG. 2) commences execution of the process. The process is permitted to execute uninterrupted for the duration of the time slice 42. Throughout a duration of the time slice 42, the process does not call a procedure referred to as the "lock procedure", which permits the execution time to be extended. The lock procedure may not have been called for one of at least two reasons. First, the process may not be enabled to call lock. As noted above, only critical processes are enabled to call the lock procedure. Second, the process may have determined that it was able to complete within its allocated time slice 42, in which case lock would not be called. In either event, the process is switched out (at 46) where the time slice 42 ends.

Time management in accordance with the invention is accomplished by maintaining a local time counter 24 (FIG. 1) at each of the respective processors 12. When a process is switched in (at 44), the scheduler program initializes the time counter 24 to a value representative of a duration of time slice 42. Thereafter, the processor 12 decrements the time counter 24 at regular intervals. When the time counter expires (is decremented to zero), the time counter causes a hardware interrupt which sets a time slice expired flag that prompts the scheduler to switch the process out and replace it with a next process. When the process is switched out, it is either committed or rolled back, as shown in FIG. 2 (step F).

Figure 5B:
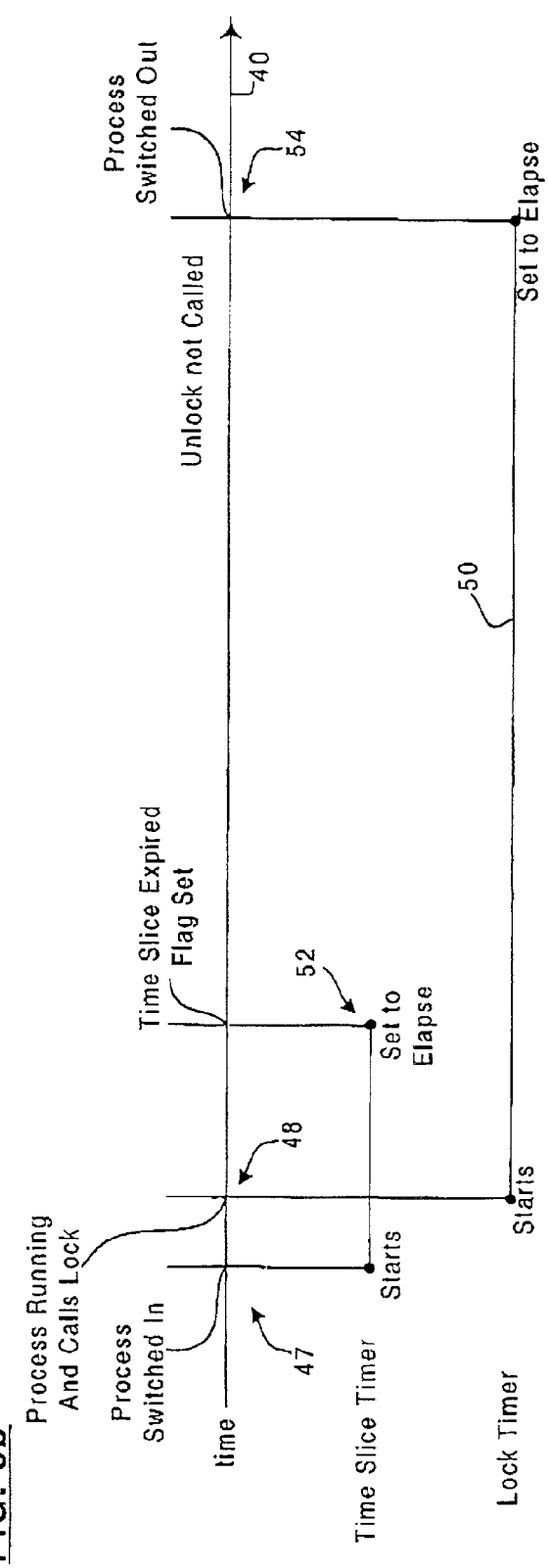

FIG. 5b shows a time line 40 in which a process calls the lock procedure in order to extend the time during which the process is permitted to continue to execute. As shown in FIG. 5b, the process is switched in (at 47) and the time slice counter 24 is initialized by the scheduler program. At 48, the process determines that the lock procedure should be called. Triggers for calling the lock procedure may be implemented in a number of ways well known in the art. For example, the lock procedure may be triggered if the process computes a percentage completion that is below expectation, the process is delayed by a procedure call, the process must execute a specific program branch, etc. When lock is called, the lock procedure computes a lock interval 50, which is an engineered interval that may be based on an integer number or the duration of time slice 42, for example. The lock procedure sets a lock counter using the computed lock duration. When the time slice counter 24 expires at 52, A time slice expired flag is set, but the process is not interrupted and continues to execute. In the example shown, the process fails to call an "unlock" procedure and is switched out by the scheduler program at 54 because the lock counter has expired. In accordance with the invention, processes are prevented from overconsuming system resources by being switched out after the expiration of the lock interval 50, regardless of whether processing has completed.

FIG. 5c shows a time line 40 diagram to further illustrate the time management procedures in accordance with the invention. As shown in FIG. 5c, a process is switched in to one of the processors 12 at 56, and the time slice counter is initialized by the scheduler program to the engineered interval associated with the class. At 59, the process calls the lock procedure and the lock procedure sets a lock flag and initializes the lock timer counter to the lock interval 50. The process continues uninterrupted processing until processing is completed and unlock is called, as shown at 60. Since the time slice interval 42 has not expired, however, the process is not switched out until the expiration of the time slice counter causes the hardware interrupt, as shown at 62.

FIG. 5d illustrates yet another aspect of the time management for process execution in accordance with the invention. As shown in FIG. 5d, a process is switched in to one of processors 12 (at 64) by the scheduler which initializes the time slice counter to the duration of the time slice 42 associated with the class of the process. At 66, the process calls lock to ensure that it can continue processing, if required, past the expiration of the time slice 42. When expiration of the time slice counter 24 (FIG. 1) causes a hardware interrupt at the processor 12, the time slice expired flag is set, as shown at 68. The process, however, continues to execute until its processing is completed and it calls the unlock procedure, as shown at 70. When the unlock procedure is called, the lock flag is removed and the lock clock is stopped. Thereafter, the process is switched out by the scheduler program.

Figure 6:
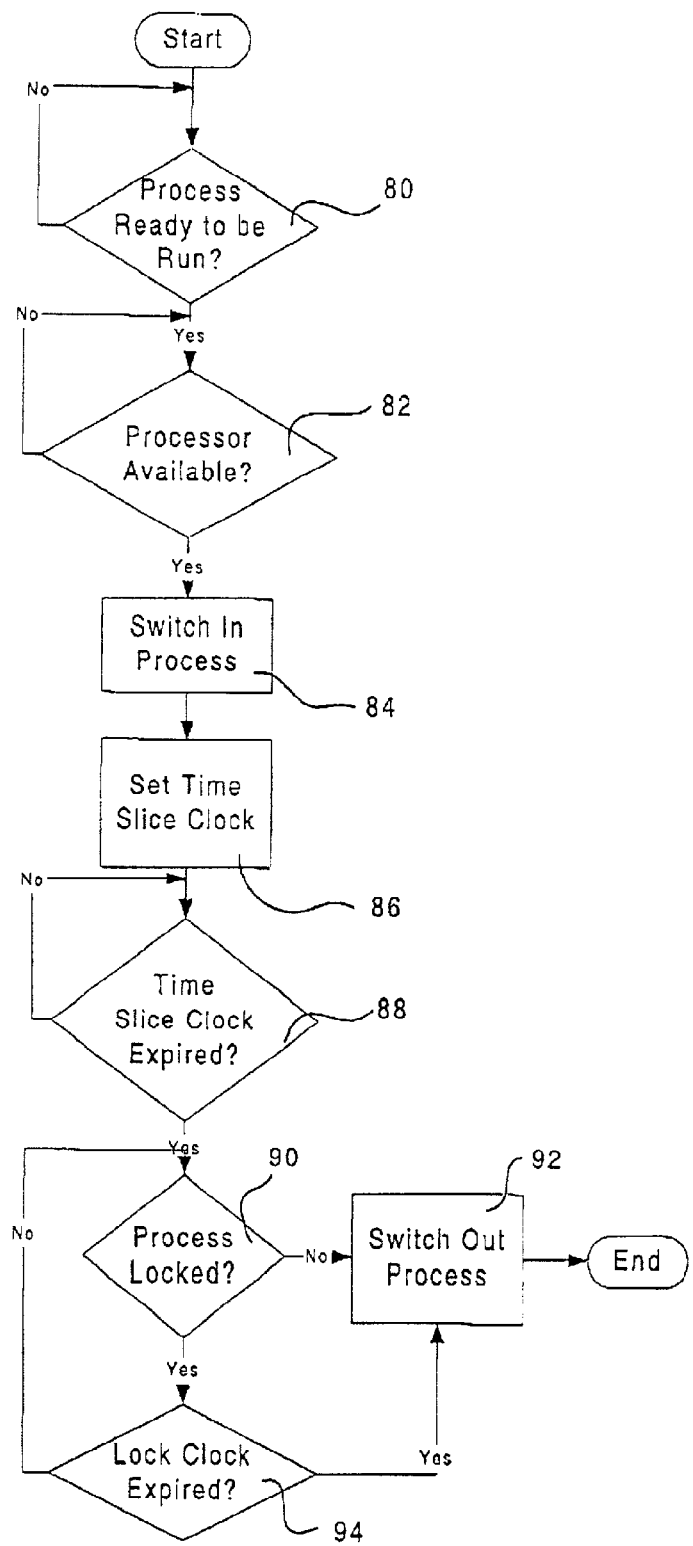
FIG. 6 is a flow diagram illustrating the actions performed by the scheduler program while performing time management of process execution shown in FIGS. 5a–5d.

FIG. 6 is a flow diagram that illustrates the actions of the scheduler during process time management in accordance with the invention. As shown in FIG. 6, the process begins when the scheduler program checks ready queues 31 (FIG. 2) to determine whether there is a process ready to be run (step 80). If not, the scheduler program waits for a next cycle to again inspect the ready queues 31. If there is a process ready to be run, the scheduler program determines whether a one of the processors 12 (FIG. 2) is available (step 82). If all of the processors 12 are occupied, the scheduler program waits to a next scheduler interval to determine the availability of a processor 12. If a processor is available, the process is moved from the ready queue 32 to the processor 12, and the processor is "switched in" in step 84. When the process is switched in, the scheduler program initializes the time slice clock timer (step 86), as described above.

During each scheduling interval, the scheduling process checks the time slice clock counter at each of the respective processors 12 to determine whether the time slice clock has expired, as indicated by the time slice expired flag (see FIG. 5b). This check is cyclically repeated during each scheduling interval If any one of the time slice clocks has expired, the scheduler program determines whether the process is locked, as indicated by the process lock flag set by the lock procedure, as described above. The process lock flag may be, for example, a Boolean, as is well understood in the art. If the process is not locked, the process is switched out in step 92 and time management for that process ends. If the process is locked, the scheduler determines whether the lock clock has expired in step 94. If the lock clock has expired, the process is switched out in step 92, and the time management for that process ends. If the lock clock has not expired, the scheduler returns to step 90 and at the next scheduling cycle determines whether the process is still locked. Steps 90–94 are repeated until the lock clock has expired, or the process has called the unlock procedure, whichever occurs first.

Figure 7A:
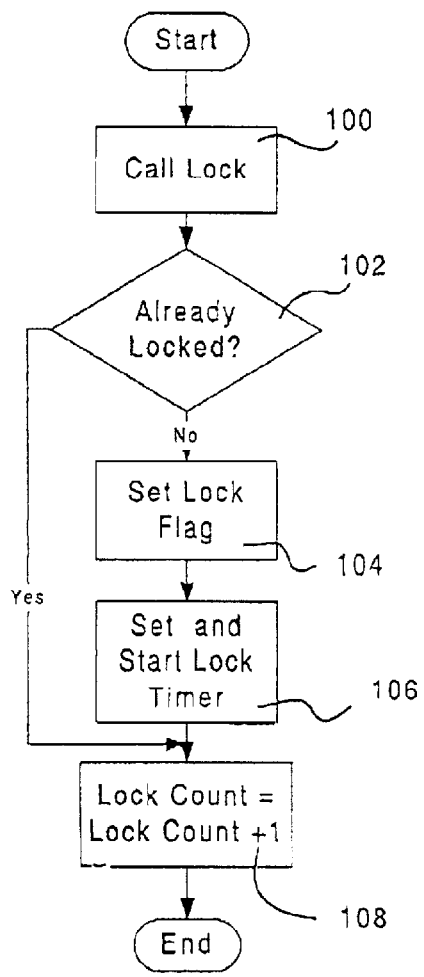
FIGS. 7a and 7b are flow diagrams illustrating actions performed by a lock procedure and an unlock procedure, respectively, in accordance with the invention.

FIG. 7a is a flow diagram that illustrates the principal actions of the lock procedure. When the lock procedure is called (step 100), the lock procedure first checks the lock flag to determine whether the process is already locked. In accordance with the invention, in order to simplify programming and accounting procedures, lock calls may be nested. The nesting of lock calls does not affect the duration of the lock time interval (FIG. 5b). If the process is already locked, as determined in step 102, the lock procedure proceeds to step 108 and simply increments a lock count before it returns. If the process is not already locked, however, the lock procedure sets a lock flag in step 104 and initializes and starts the lock timer in step 106. It then increments the lock count in step 108 before it returns.

Figure 7B:
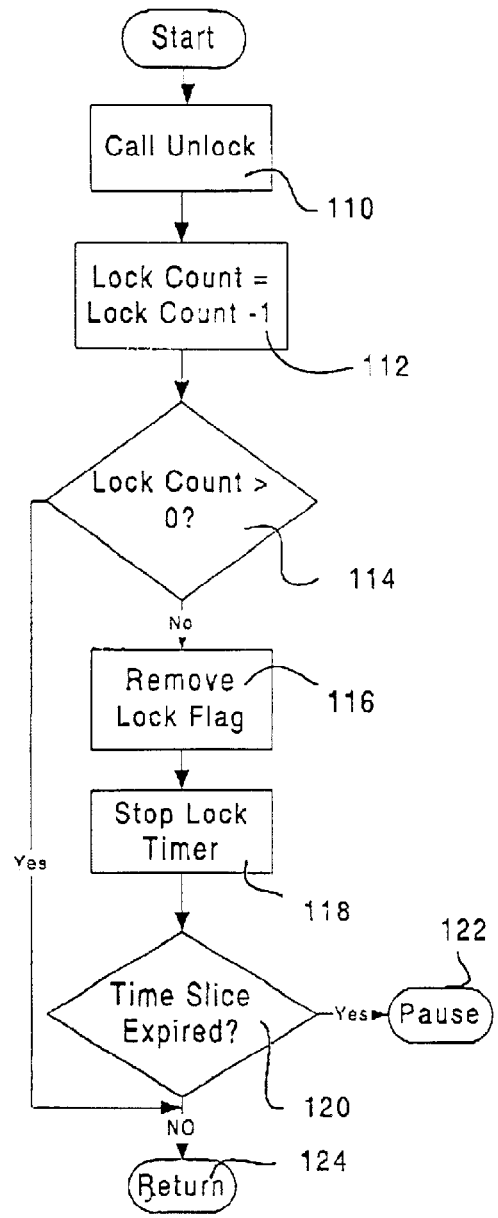

FIG. 7b is a flow diagram illustrating processes performed by the unlock procedure described above with reference to FIGS. 5b–5d. In step 110, the unlock procedure is called by an executing process. As a first action, the unlock procedure decrements the lock count (step 112). The unlock procedure then examines the lock count to determine whether the lock count is greater than zero (step 114). If the lock count is greater than zero, the process returns in step 114. If the lock count is not greater than zero, the unlock process removes the lock flag in step 116 and stops the lock timer in step 118. The unlock procedure then determines whether the time slice has expired in step 120. If the time slice has expired, the unlock procedure pauses in step 122. Otherwise, the unlock procedure returns in step 124.

The invention therefore provides novel time management methods and a novel shared memory parallel processor computing machine that incorporates the novel time management methods to provide a more robust and efficient shared memory parallel processor computing machine that is capable of higher throughputs. The shared memory parallel processor computing machine in accordance with the invention is particularly well adapted for use as a central processor for time division multiplexed telephone switches, but may likewise be utilized in any other computing application where high throughput of short duration processes is required.

The embodiment(s) of the invention described above is(are) intended to be exemplary only. The scope of the invention is therefore intended to be limited solely by the scope of the appended claims.

I claim:

1. A method of managing execution time in a shared memory parallel processor computing environment in which a plurality of independent processors execute processes simultaneously, comprising steps of:
   defining a plurality of process classes and assigning a one of the process classes to each process to be executed by the plurality of independent processors using the shared memory;
   defining an execution time slice for each of the process classes; and
   permitting each process executed by each of the plurality of independent processors to be executed without interruption until the execution time slice defined for the process class has expired or the processor has completed execution of the process.

2. A method as claimed in claim 1 further comprising a step of enabling processes of at least one of the process classes to call a lock procedure during execution, which permits the process to continue to be executed without interrupt for a predefined period of time after the time slice associated with the process class has expired.

3. A method as claimed in claim 2 further comprising a step of enabling the at least one of the processes to call an unlock procedure to permit execution of the process to be terminated before the predefined period of time has expired.

4. A method as claimed in claim 2 wherein the predefined period of time is an integer multiple of the time slice associated with the process class.

5. A method as claimed in claim 2 wherein the lock procedure may be called repeatedly by the same process.

6. A method as claimed in claim 5 further comprising a step of keeping a count of lock states declared by the lock procedure.

7. A method as claimed in claim 6 further comprising a step of decrementing the count each time the unlock procedure is called.

8. A method as claimed in claim 7 further comprising a step of testing the count each time the count is decremented to determine if the count is greater than zero, and declaring the process unlocked if the count is not greater than zero.

9. A method as claimed in claim 8 wherein declaring a process locked and declaring a process unlocked comprises a step of setting a lock flag to a first value when the process is declared locked and setting the lock flag to a second value when the process is declared unlocked.

10. A method as claimed in claim 9 wherein the lock flag is a Boolean variable.

11. A method as claimed in claim 8 further comprising a step of terminating execution of the process if the process is declared unlocked after the time slice allocated to the process has expired.

12. A method as claimed in claim 8 further comprising a step of permitting the process to continue execution for a remainder of the time slice if the process is declared unlocked before the time slice allocated to the process has expired.

13. A method as claimed in claim 1 wherein the execution time slice is stored in a time slice counter maintained by a processor that executes the process.

14. A method as claimed in claim 13 wherein the time slice counter is initialized by a scheduler that schedules the process to be executed by the processor.

15. A method of managing a timer queue in a shared memory parallel processor computing environment in which a plurality of independent processors execute processes simultaneously, the timer queue being used to queue processes in a wait state until a predetermined process removal time has expired, the method comprising steps of:
   defining a variable for storing a time at which a next process is to be removed from the timer queue for execution by one of the plurality of independent processors using the shared memory;
   periodically examining the variable without generating a system interrupt to determine whether the time stored in the variable is less than or equal to an instant system time;
   removing each process from the timer queue which has an associated removal time that is less than or equal to the instant system time; and
   re-computing a time at which a next process is to be removed from the timer queue, and storing the re-computed time in the variable.

16. The method as claimed in claim 15 wherein adding new processes to the timer queue further comprises steps of:
   computing a delay time specified by the process to be added to the queue;
   comparing the computed delay time with the time stored in the variable;
   if the computed delay time is less than the delay time stored in the variable, replacing the delay time stored in the variable; and
   adding the process to the timer queue.

17. The method as claimed in claim 15 further comprising a step of re-ordering the timer queue each time at least one process is removed.

18. The method as claimed in claim 15 further comprising a step of placing processes removed from the timer queue into a ready queue for execution by a one of the processors.

19. The method as claimed in claim 18 wherein the ready queue in which a process is placed is governed by a class with which the process is associated.

20. The method as claimed in claim 19 wherein the ready queue is a first-in-first-out (FIFO) queue and the process is placed at a rear end of the FIFO queue.

21. A shared memory parallel processor computing machine in which a plurality of independent processors simultaneously execute processes, comprising:
   means for associating each process to be executed with a process class that defines rights and priorities associated with the process;
   means for associating an execution time slice with each of the process classes; and
   means for monitoring a process during execution of the process by one of the plurality of independent processors using the shared memory, to permit the process to be executed by the processor without interruption until the execution time slice associated with the process class has expired or the processor has completed execution of the process.

22. A computing machine as claimed in claim 21 wherein the means for permitting a process to be executed without interruption comprises a time slice counter that is initialized to a count representative of the predetermined execution time slice when the process is scheduled to be run, and is decremented at predetermined time intervals while the process is being executed.

23. A computing machine as claimed in claim 22 wherein the time slice counter is initialized by a scheduler program that schedules the process to be executed by the processor.

24. A computing machine as claimed in claim 22 wherein the time slice counter generates a hardware interrupt when the time slice is decremented to zero.

25. A computing machine as claimed in claim 21 further comprising a lock procedure that may be called by predetermined processes to permit the processes to continue to execute after the execution time slice has expired.

26. A computing machine as claimed in claim 25 wherein the predetermined processes are defined by a class attribute that indicates that processes belonging to an associated class can call the lock procedure.

27. A computing machine as claimed in claim 25 wherein the lock procedure sets a lock flag to indicate that the process is locked.

28. A computing machine as claimed in claim 25 wherein the lock procedure also initializes a lock time counter to a predetermined value.

29. A computing machine as claimed in claim 28 wherein the lock procedure initializes the lock counter to an integer multiple of the process time slice.

30. A computing machine as claimed in claim 25 further comprising an unlock procedure that may be called by the predefined processes enabled to call the lock procedure.

31. A computing machine as claimed in claim 30 wherein the predefined procedures are permitted to call the lock procedure more than once in succession without calling the unlock procedure.

32. A computing machine as claimed in claim 21 further comprising a timer queue for queuing processes to be executed for a predetermined period of time, the timer queue being managed without interrupt until a process in the timer queue is ready to be transferred to a ready queue for execution by a one of the processors.

33. A computing machine as claimed in claim 32 further comprising a timer queue variable for storing a time at which a next process is to be removed from the timer queue and placed in the ready queue.

34. A computing machine as claimed in claim 33 further comprising a scheduler for periodically comparing the timer queue variable with a current system time to determine when a next process is to be removed from the timer queue and placed in the ready queue.

35. A computing machine as claimed in claim 34 wherein the scheduler is further adapted to compute a time at which a process is to be removed from the timer queue when the process is added to the timer queue, and the scheduler is further adapted to update the timer queue variable if the timer queue variable is greater than the time computed by the scheduler.

36. A computing machine as claimed in claim 35 wherein the scheduler program is further adapted to remove at least one process from the timer queue each time the timer queue variable is less than or equal to a current system time, and to reinitialize the timer queue variable based on a time at which an next process is to be removed from the timer queue.

* * * * *